US010644862B2

(12) United States Patent
Doi

(10) Patent No.: US 10,644,862 B2
(45) Date of Patent: May 5, 2020

(54) COMMUNICATION REPEATER SYSTEM AND METHOD

(71) Applicants: Kabushiki Kaisha Toshiba, Minato-ku (JP); Toshiba Infrastructure Systems & Solutions Corporation, Kawasaki-shi (JP)

(72) Inventor: Toshinori Doi, Suginami (JP)

(73) Assignees: Kabushiki Kaisha Toshiba, Minato-ku (JP); Toshiba Infrastructure Systems & Solutions Corporation, Kawasaki-shi (JP)

( * ) Notice: Subject to any disclaimer, the term of this patent is extended or adjusted under 35 U.S.C. 154(b) by 117 days.

(21) Appl. No.: 15/959,901

(22) Filed: Apr. 23, 2018

(65) Prior Publication Data
US 2018/0309562 A1 Oct. 25, 2018

(30) Foreign Application Priority Data
Apr. 24, 2017 (JP) .................................. 2017-085542

(51) Int. Cl.
*H04L 5/14* (2006.01)
*H04B 7/14* (2006.01)
*H04B 7/155* (2006.01)

(52) U.S. Cl.
CPC ............ *H04L 5/1461* (2013.01); *H04B 7/14* (2013.01); *H04B 7/15528* (2013.01); *H04L 5/1469* (2013.01)

(58) Field of Classification Search
CPC . H04W 56/00; H04W 72/0453; H04W 84/20; H04L 5/0053; H04L 7/0075; H04L 5/1461; H04L 5/1469
See application file for complete search history.

(56) References Cited

U.S. PATENT DOCUMENTS

| 2014/0180581 A1* | 6/2014 | Berlin | G06F 17/40 |
| | | | 701/491 |
| 2017/0150464 A1* | 5/2017 | Kazehaya | H04B 7/269 |

FOREIGN PATENT DOCUMENTS

| JP | 8-237731 | 9/1996 |
| JP | 11-8879 | 1/1999 |
| JP | 2007-6163 | 1/2007 |

* cited by examiner

*Primary Examiner* — Natasha W Cosme
(74) *Attorney, Agent, or Firm* — Oblon, McClelland, Maier & Neustadt, L.L.P.

(57) ABSTRACT

According to one embodiment, a communication repeater system repeats communication by time division duplex scheme. The system includes a timing detector that detects each of transmission/reception switching timings between a master station device and each of radio frequency units, a protection level detector that detects a level of synchronization protection of each of base station systems, a setter that sets, as reference transmission/reception switching timing, a transmission/reception switching timing corresponding to one of the base station systems having a higher level of synchronization protection among the transmission/reception switching timings on the basis of a result of the detection by the protection level detector, and a corrector that corrects a variation in the transmission/reception switching timings in accordance with the reference transmission/reception switching timing.

10 Claims, 10 Drawing Sheets

COMMUNICATION REPEATER SYSTEM AND METHOD

CROSS-REFERENCE TO RELATED APPLICATION

This application is based upon and claims the benefit of priority from Japanese Patent Application No. 2017-085542, filed Apr. 24, 2017, the entire contents of which are incorporated herein by reference.

FIELD

Embodiments described herein relate generally to a communication repeater system and method.

BACKGROUND

Radio transmission schemes, including frequency division duplexing (FDD) and time division duplexing (TDD), for mobile communication terminal devices such as mobile phones and smartphones are known. FDD employs two different frequency bands as a pair of a downlink signal and an uplink signal while TDD employs a downlink signal and an uplink signal in the same frequency band by time division.

A shared repeater system is also known in which service providers (carriers: communication service providers) share a repeater system (communication repeater system) for enabling use of mobile communication terminal devices in dead zones including indoors.

The FDD radio transmission requires a certain frequency interval (gap) between a downlink frequency band and an uplink frequency band. In recent years, the use of the TDD radio transmission scheme has been increasing due to tightness of available frequencies.

Thus, an increase in the number of devices by the TDD radio transmission scheme in the shared repeater system is expected.

In the shared repeater system adopting the TDD radio transmission, variations in time-division timing in adjacent bands among different service providers may cause mutual interference and deterioration in service quality or stop of service.

It is an object of the present invention to provide a communication repeater system and method which can reduce variations in time-division timing among different service providers and ensure improvements in service quality and continuity of service.

DETAILED DESCRIPTION

In general, according to one embodiment, a communication repeater system includes a master station device and a plurality of radio frequency units which converts a signal from each of base station systems into an optical digital signal and transmits the optical digital signal to the master station device. The base station systems establish communication by time division duplex scheme. The communication repeater system repeats communication between a mobile communication terminal device and each of the base station systems via a corresponding one of slave station devices. The communication repeater system further includes a timing detector, a protection level detector, a setter, and a corrector.

The timing detector detects each of transmission and reception switching timings between the master station device and each of the radio frequency units.

The protection level detector detects a level of synchronization protection of each of the base station systems.

The setter sets one of the transmission and reception switching timings as reference transmission and reception switching timing on the basis of a result of the detection by the protection level detector, the one of the transmission and reception switching timings corresponding to one of the base station systems having a higher level of synchronization protection.

The corrector corrects a variation in the transmission and reception switching timings in accordance with the reference transmission and reception switching timing.

Next, exemplary embodiments will be described in detail with reference to the appended drawings.

Figure 1:
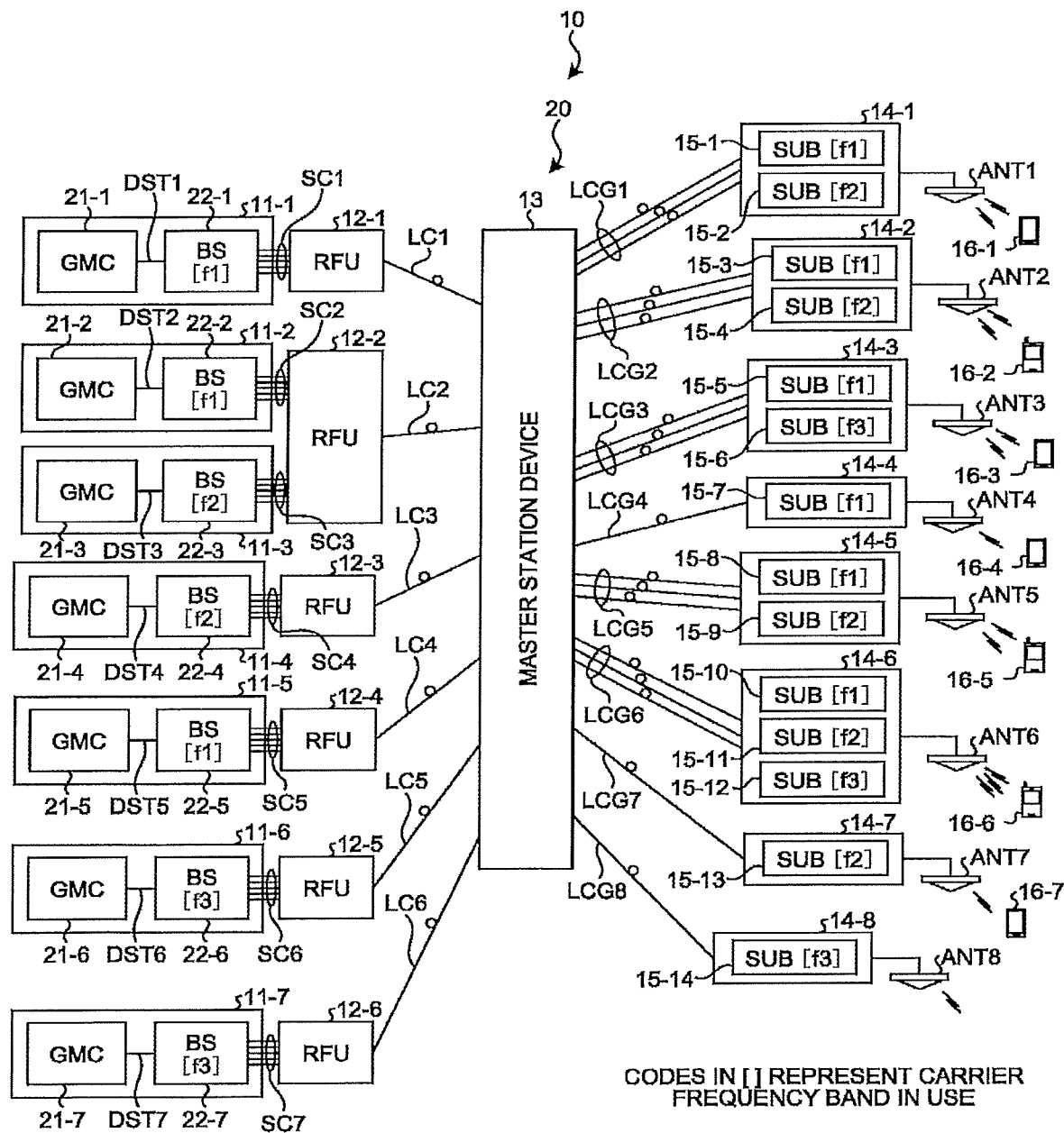
FIG. 1 is a schematic configuration block diagram of a communication repeater system according to an embodiment.

FIG. 1 is a schematic configuration block diagram of a communication system including a communication repeater system according to an embodiment.

A communication system 10 includes base station systems 11-1 to 11-7, a communication repeater system 20, antenna units ANT1 to ANT8, and mobile communication terminal devices 16-1 to 16-7, as illustrated in FIG. 1.

The communication repeater system 20 includes radio frequency units (hereinafter referred to "RFUs") 12-1 to 12-6, a master station device 13, and slave station devices 14-1 to 14-8.

Next, a configuration of the communication system 10 will be described in detail.

First, a configuration of each of the base station systems 11-1 to 11-7 will be described.

The base station system 11-1 includes a grand master clock (GMC) unit 21-1 that receives a global navigation satellite system (GNSS) signal from a GNSS and outputs reference time data DST1 and a base station device (represented by BS in FIG. 1) 22-1 that controls communication on the basis of the reference time data DST1 via a radio frequency communication signal SC1 in a carrier frequency band f1. In FIG. 1, the GMC units are denoted as GMC.

The base station system 11-2 includes a grand master clock (GMC) unit 21-2 that receives a GNSS signal and outputs reference time data DST2, and a base station device 22-2 that controls communication on the basis of the reference time data DST2 via a radio frequency communication signal SC2 in the carrier frequency band f1.

The base station system 11-3 includes a grand master clock (GMC) unit 21-3 that receives a GNSS signal and outputs reference time data DST3, and a base station device 22-3 that controls communication on the basis of the reference time data DST3 via a radio frequency communication signal SC3 in a carrier frequency band f2.

The base station system 11-4 includes a grand master clock (GMC) unit 21-4 that receives a GNSS signal and outputs reference time data DST4, and a base station device 22-4 that controls communication on the basis of the reference time data DST4 via a radio frequency communication signal SC4 in the carrier frequency band f2.

The base station system 11-5 includes a grand master clock (GMC) unit 21-5 that receives a GNSS signal and outputs reference time data DST5, and a base station device 22-5 that controls communication on the basis of the reference time data DST5 via a radio frequency communication signal SC5 in the carrier frequency band f1.

The base station system 11-6 includes a grand master clock (GMC) unit 21-6 that receives a GNSS signal and outputs reference time data DST6, and a base station device 22-6 that controls communication on the basis of the reference time data DST6 via a radio frequency communication signal SC6 in a carrier frequency band f3.

The base station system 11-7 includes a grand master clock (GMC) unit 21-7 that receives a GNSS signal and outputs reference time data DST7, and a base station device 22-7 that controls communication on the basis of the reference time data DST7 via a radio frequency communication signal SC7 in the carrier frequency band f3.

Next, a configuration of the communication repeater system 20 will be described.

First, the RFUs 12-1 to 12-6 of the communication repeater system 20 will be described.

The RFU 12-1 receives radio frequency communication signals SCI corresponding to mobile communication terminal devices from the base station system 11-1 via communication cables such as coaxial cables. Then, the RFU 12-1 multiplexes the radio frequency communication signals SC1 into a digital signal SLD1 and transmits the digital signal SLD1 to the master station device 13 via an optical cable LC1.

The RFU 12-2 receives radio frequency communication signals SC2 corresponding to mobile communication terminal devices from the base station system 11-2 via communication cables such as coaxial cables. Then, the RFU 12-2 multiplexes the radio frequency communication signals SC2 into an optical digital signal SLD2 and transmits the optical digital signal SLD2 to the master station device 13 via an optical cable LC2.

Further, the RFU 12-2 receives radio frequency communication signals SC3 corresponding to mobile communication terminal devices from the base station system 11-3 via communication cables such as coaxial cables. Then, the RFU 12-2 multiplexes the radio frequency communication signals SC3 into an optical digital signal SLD3 and transmits the optical digital signal SLD3 to the master station device 13 via an optical cable LC3.

The RFU 12-3 receives radio frequency communication signals SC4 corresponding to mobile communication terminal devices from the base station system 11-4 via communication cables such as coaxial cables. Then, the RFU 12-3 multiplexes the radio frequency communication signals SC4 into an optical digital signal SLD4 and transmits the optical digital signal SLD4 to the master station device 13 via an optical cable LC4.

The RFU 12-4 receives radio frequency communication signals SC5 corresponding to mobile communication terminal devices from the base station system 11-5 via communication cables such as coaxial cables. Then, the RFU 12-4 multiplexes the radio frequency communication signals SC5 into an optical digital signal SLD5 and transmits the optical digital signal SLD5 to the master station device 13 via an optical cable LC5.

The RFU 12-5 receives radio frequency communication signals SC6 corresponding to mobile communication terminal devices from the base station system 11-6 via communication cables such as coaxial cables. Then, the RFU 12-5 multiplexes the radio frequency communication signals SC6 into an optical digital signal SLD6 and transmits the optical digital signal SLD6 to the master station device 13 via an optical cable LC6.

The RFU 12-6 receives radio frequency communication signals SC7 corresponding to mobile communication terminal devices from the base station system 11-7 via communication cables such as coaxial cables. Then, the RFU 12-6 multiplexes the radio frequency communication signals SC7 into an optical digital signal SLD7 and transmits the optical digital signal SLD7 to the master station device 13 via an optical cable LC7.

Next, the slave station devices 14-1 to 14-8 of the communication repeater system 20 will be described.

The slave station device 14-1 includes a sub unit (represented by SUB in FIG. 1) 15-1 that communicates with the mobile communication terminal device via the antenna unit ANT1 in the carrier frequency band f1 and a sub unit 15-2 that communicates with the mobile communication terminal device via the antenna unit ANT1 in the carrier frequency band f2.

The slave station device 14-2 includes a sub unit 15-3 that communicates with the mobile communication terminal device via the antenna unit ANT2 in the carrier frequency band f1 and a sub unit 15-4 that communicates with the mobile communication terminal device via the antenna unit ANT2 in the carrier frequency band f2.

The slave station device 14-3 includes a sub unit 15-5 that communicates with the mobile communication terminal device via the antenna unit ANT3 in the carrier frequency band f1 and a sub unit 15-6 that communicates with the mobile communication terminal device via the antenna unit ANT3 in the carrier frequency band f3.

The slave station device 14-4 includes a sub unit 15-7 that communicates with the mobile communication terminal device via the antenna unit ANT4 in the carrier frequency band f1.

The slave station device 14-5 includes a sub unit 15-8 that communicates with the mobile communication terminal device via the antenna unit ANTS in the carrier frequency band f1 and a sub unit 15-9 that communicates with the mobile communication terminal device via the antenna unit ANT5 in the carrier frequency band f2.

The slave station device 14-6 includes a sub unit 15-10 that communicates with the mobile communication terminal device via the antenna unit ANT6 in the carrier frequency band f1, a sub unit 15-11 that communicates with the mobile communication terminal device via the antenna unit ANT6 in the carrier frequency band f2, and a sub unit 15-12 that communicates with the mobile communication terminal device via the antenna unit ANT6 in the carrier frequency band f3.

The slave station device 14-7 includes a sub unit 15-13 that communicates with the mobile communication terminal device via the antenna unit ANT7 in the carrier frequency band f2.

The slave station device 14-8 includes a sub unit 15-14 that communicates with the mobile communication terminal device via the antenna unit ANT7 in the carrier frequency band f3.

Next, the master station device 13 of the communication repeater system 20 will be described.

The master station device 13 corrects differences in delay among the service providers being the RFUs 12-1 to 12-6 and differences in delay among the slave station devices 14-1 to 14-8, to reduce variations in effective transmission/reception switching timing (time division duplex (TDD) timing) of the antenna units ANT1 to ANT7. This is because in the above communication repeater system 20, the antenna units ANT1 to ANT8 are disposed in the area that transmission and reception waves can interfere with each other, so that the variations in the transmission/reception switching timings among the service providers cause the transmission and reception waves to mutually interfere, making proper communication unfeasible.

In view of this, in the present embodiment, the master station device 13 detects and adjusts the variations in the transmission/reception switching timing to thereby prevent the transmission/reception waves from mutually interfering due to the variations in the transmission/reception switching timings of the antenna units ANT1 to ANT8.

This can greatly reduce the load on the slave station devices 14-1 to 14-8 from when the slave station devices 14-1 to 14-8 alone prevent mutual interference between the transmission and reception waves, leading to reducing system building costs and system operation costs.

The causes of the variations in the TDD timing will be described.

The causes of the variations in the TDD timing include (1) differences in delay among the service providers and (2) differences in delay among the slave station devices.

The following five examples of differences in delay among the service providers are assumed:

(1.1) Variations in the grand master clock (GMC: reference clock) due to individual differences among the GMC units 21-1 to 21-6 of the respective service providers;

(1.2) Differences in (processing) delay due to individual differences among the base station devices 22-1 to 22-7 of the respective service providers;

(1.3) Differences in (transmission) delay due to differences in signal line lengths between the base station devices 22-1 to 22-7 of the respective service providers and the corresponding RFUs 12-1 to 12-6;

(1.4) Differences in (processing) delay due to individual differences among detector circuits of the (1.5) Differences in (transmission) delay due to differences in cable lengths among the optical cables LC1 to LC6 between each of the RFUs 12-1 to 12-6 and the master station device 13.

The following two examples of differences in delay among the slave station devices are assumed:

(2.1) Differences in (transmission) delay due to a difference in cable lengths of optical cables between each of the slave station devices 14-1 to 14-8 and the master station device 13; and (2.2) Differences in (processing) delay due to individual differences among the respective slave station devices 14-1 to 14-8.

Among the causes of the variations in the TDD timing, the differences in delay among the slave station devices in item (2) are corrected by various conventional methods. The differences in delay among the service providers will be thus described below.

From the master station device 13's point of view, the differences in delay among the service providers are considered as effective delay occurring between each of the RFUs 12-1 to 12-6 and the master station device 13. That is, delay (variation) occurring between each of the RFUs 12-1 to 12-6 and the master station device 13 needs to be corrected.

In this case, the modes of processing will differ depending on whether the master station device 13, the RFUs 12-1 to 12-6, and the slave station devices 14-1 to 14-8 each have absolute reference timing (timing signal).

Combinations of all the situations are assumable as modes. The following five modes will be exemplified from a realistic point of view:

(1) First mode: the master station device 13 and all the RFUs 12-1 to 12-6 have absolute reference timing (timing signal);

(2) Second mode: only the master station device 13 has absolute reference timing (timing signal);

(3) Third mode: only one of the RFUs (for example, RFU 12-1) has absolute reference timing (timing signal);

(4) Fourth mode: only one slave station device 14-X has absolute reference timing (timing signal); and (5) Fifth mode: none of the master station device 13, the RFUs 12-1 to 12-6, and the slave station devices 14-1 to 14-8 has absolute reference timing (timing signal).

A configuration and an operation of the communication repeater system 20 will be described below in order of the modes.

(1) The master station device 13 and all the RFUs 12-1 to 12-6 have absolute reference timing (timing signal).

In this case, it is assumed that the master station device 13 and all the RFUs 12-1 to 12-6 are provided with (or connected to) one of a global positioning system (GPS) receiver, a GMC unit, a terrestrial digital tuner, and an atomic clock.

Alternatively, at least one of the master station device 13, the RFUs 12-1 to 12-6, and the slave station devices 14-1 to 14-8 includes one of the GPS receiver, the GMC unit, the terrestrial digital tuner, and the atomic clock, and the rest of the devices are in compliance with precision time protocol (PTP) specified in IEEE 1588.

Herein, assumed that the master station device 13 is connected to the GMC unit, and all of the RFUs 12-1 to 12-6 are compliant with the PTP specified in IEEE 1588, time synchronization process will be described by way of example.

The PTP is a protocol for synchronizing time among the devices connected to a local area network (LAN). In this example, the master station device 13 and the RFUs 12-1 to 12-6 are connected via the optical cables LC1 to LC6, and the master station device 13 and the slave station devices 14-1 to 14-8 are connected via the optical cables (group) LCG1 to LCG8, to function as a LAN as a whole.

In this case, it is necessary for the master station device 13 to synchronize time with the RFUs 12-1 to 12-6 and the base station systems 11-1 to 11-6 as a whole. Individual time synchronization processes between the RFU 12-1 and the master station device 13 will be first described.

Figure 2:
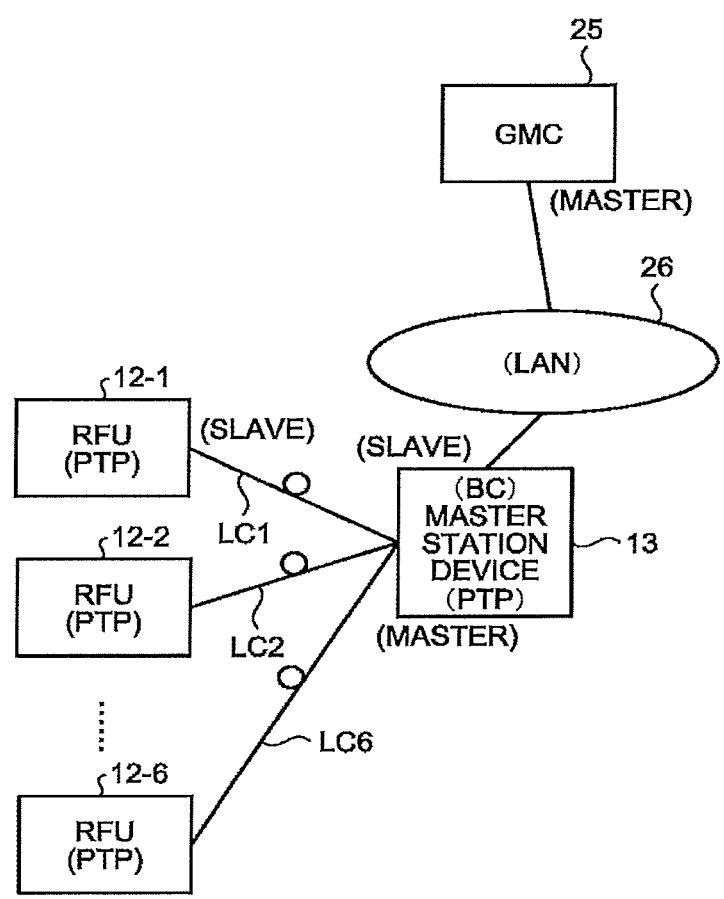
FIG. 2 is an explanatory diagram of a connection between a master station device and radio frequency units (RFUs) in a first mode.

FIG. 2 is an explanatory diagram of a connection between the master station device and the RFUs in the first mode.

To synchronize time between the master station device 13 and the RFU 12-1, the master station device 13 has a function of correcting time information transmitted from a GMC unit 25 via a LAN 26 as a boundary clock (BC) and redistributing the corrected time information to the RFU 12-1.

In the PTP, it is assumed that the GMC unit 25 functions as a master for the master station device 13 functioning as a slave, the master station device 13 functions as a master for the RFU 12-1, and the RFU 12-1 functions as a slave.

Figure 3:
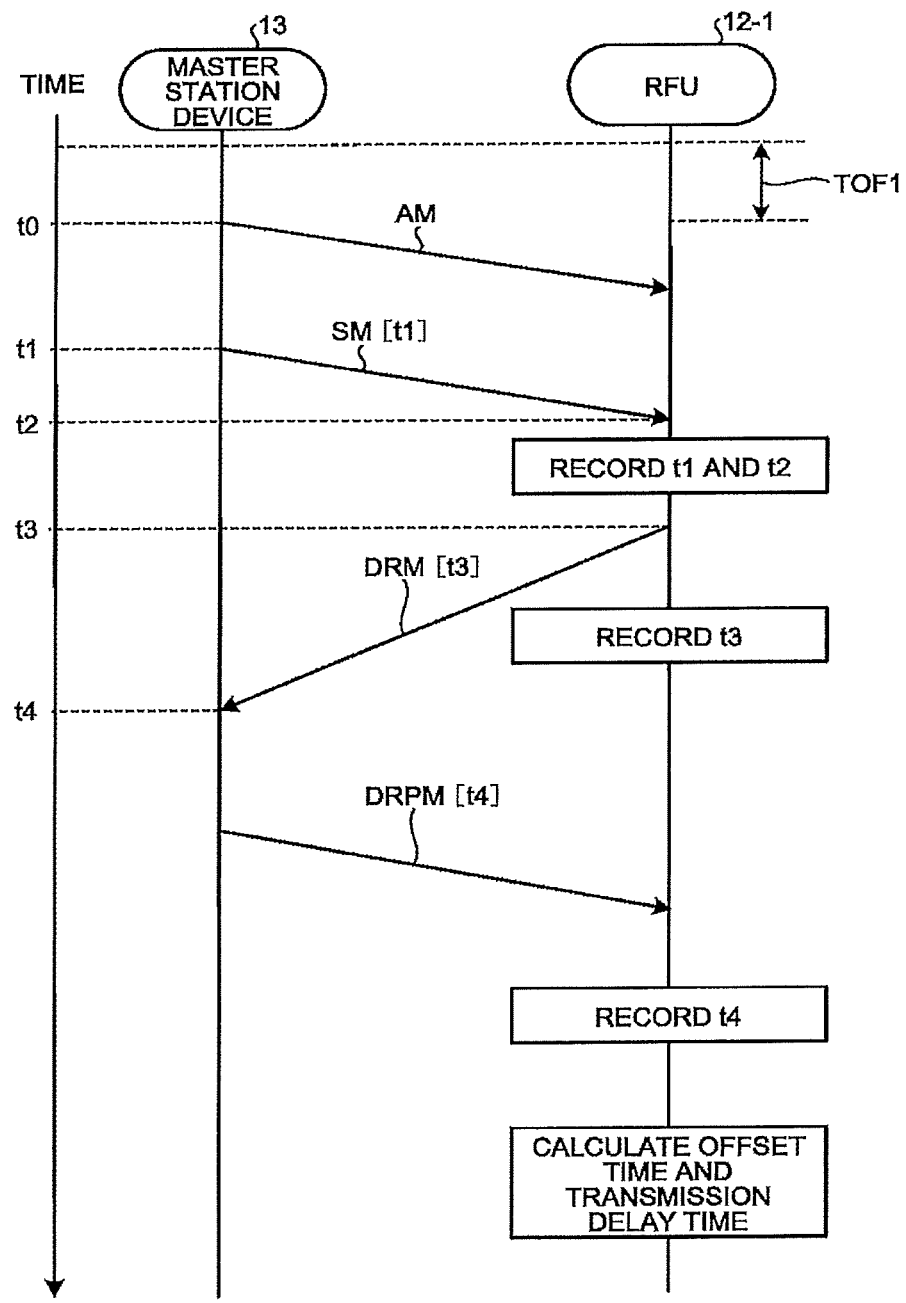
FIG. 3 is an explanatory diagram of a time synchronization process according to precision time protocol (PTP)

FIG. 3 is an explanatory diagram of the time synchronization process according to the PTP.

At time t0, the master station device 13 transmits to the RFU 12-1 an announce message AM for notification of time synchronization accuracy information.

Thereby, the RFU 12-1 knows that it will receive the time synchronization accuracy information within a predetermined period of time after the transmission of the announce message AM.

At time t1, the master station device 13 transmits a sync message SM to the RFU 12-1 as an event message.

In this case, the time t1 being the transmission time of the sync message SM is recorded in the sync message SM.

At time t2, upon receiving the sync message SM, the RFU 12-1 records reception time t2.

At time t3, the RFU 12-1 transmits a delay request message DRM to the master station device 13 to notify it of the receipt of the sync message SM.

In this case, the time t3 being the transmission time of the delay request message DRM is recorded in the delay request message DRM.

At time t4, upon receiving the delay request message DRM, the master station device 13 records reception time t4.

Further, the master station device 13 transmits a delay response message DRPM containing the reception time t4 of the delay request message DRM to the RFU 12-1.

Next, a time difference calculation method in the above situation will be described.

Herein, it is assumed that the time of a clock of the RFU 12-1 and the time of a clock of the master station device 13 are offset by an offset time TOF1.

In the above example, with transmission delay time DLY1 unchanged, a time difference from the master station device 13 (master) to the RFU 12-1 (slave) and a time difference from the RFU 12-1 (slave) to the master station device 13 (master) satisfy the following relations.

The time difference from the master station device 13 (master) to the RFU 12-1 (slave)

$$t2-t1=DLY1+TOF1 \quad (1)$$

The time difference from the RFU 12-1 (slave) to the master station device 13 (master)

$$t4-t3=DLY1-TOF1 \quad (2)$$

As a result, the RFU 12-1 calculates the transmission delay time DLY1 from the sum of Formulas (1) and (2) and calculates the offset time TOF1 from the difference between Formulas (1) and (2).

That is, $$DLY1=((t2-t1)+(t4-t3))/2 \quad (3)$$

$$TOF1=((t2-t1)-(t4-t3))/2 \quad (4)$$

Similarly, RFU 12-2 calculates an offset time TOF2 and a transmission delay time DLY2 corresponding to the master station device 13. The RFU 12-3 calculates an offset time TOF3 and a transmission delay time DLY3 corresponding to the master station device 13. The RFU 12-4 calculates an offset time TOF4 and a transmission delay time DLY4 corresponding to the master station device 13. The RFU 12-5 calculates an offset time TOF5 and a transmission delay time DLY5 corresponding to the master station device 13. The RFU 12-6 calculates an offset time TOF6 and a transmission delay time DLY6 corresponding to the master station device 13.

Thus, the RFUs 12-1 to 12-6 constantly correct time on the basis of the calculated transmission delay times DLY1 to DLY6 and the offset times TOF1 to TOF6, respectively, implementing accurate time synchronization.

Next, transmission/reception switching timing setting will be described.

Figure 4:
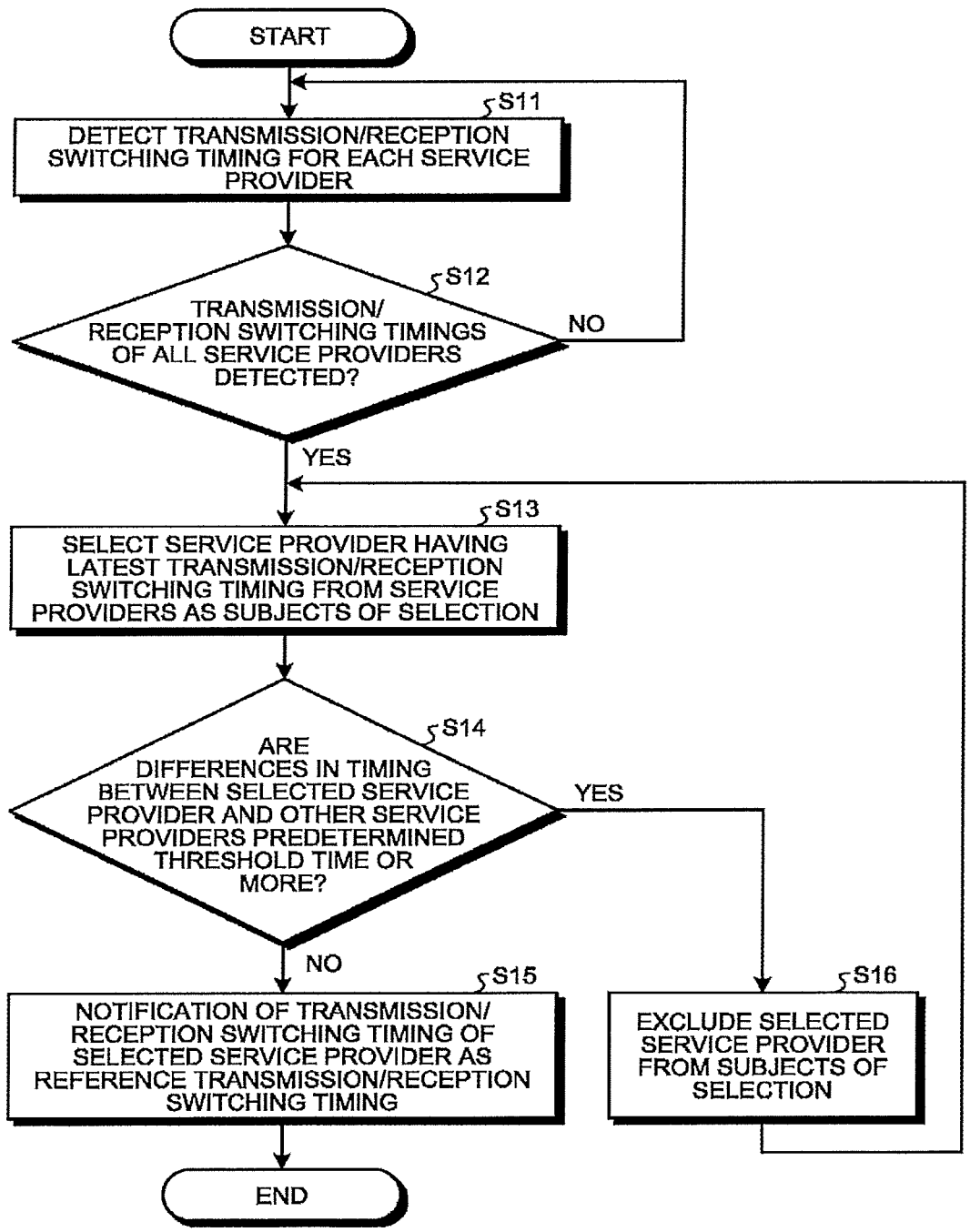
FIG. 4 is a flowchart of setting transmission/reception switching timing.

FIG. 4 is a flowchart of a transmission/reception switching timing setting process.

First, the master station device 13 detects the transmission/reception switching timing for each service provider (for each RFU in the present example) (Step S11).

Then, the master station device 13 determines whether the transmission/reception switching timings corresponding to all the service providers have been detected (Step S12).

When determining in Step S12 that the transmission/reception switching timings of all the service providers have not been detected yet (No in Step S12), the master station device 13 returns to Step S11 and repeats the process.

When determining in Step S12 that detection of the transmission/reception switching timings corresponding to all the service providers is completed (Yes in Step S12), the master station device 13 selects one of the service providers as subjects of selection of the transmission/reception switching timing, that is, the service provider corresponding to one of the base station systems 11-1 to 11-7 having a higher level of synchronization protection (Step S13).

In this case, the synchronization protection includes forward protection and backward protection.

The forward protection refers to synchronization protection for ensuring non-synchronization in a certain number of consecutive communication frames to prevent instantaneous code error from being erroneously determined as non-establishment of synchronization in spite of the fact that synchronization is established.

The backward protection refers to synchronization protection for ensuring the establishment of synchronization in a certain number of consecutive communication frames to prevent instantaneous code error from being erroneously determined as establishment of synchronization in spite of the fact that synchronization is not achieved.

In both of the synchronization protections, the longer the continuation time of the synchronization is, the higher the level of protection the synchronization is regarded for.

Then, the master station device 13 determines whether differences in the transmission/reception switching timing between the selected service provider and the other service providers are a predetermined threshold time or more (Step S14).

Herein, the predetermined threshold time is defined as a period of time set for detecting anomaly in the transmission/reception switching timing caused by a failure of a timer (clock) that the service provider concerned uses for acquiring time information. In other words, the predetermined threshold time is used for excluding unlikely transmission/reception switching timings, considering the expected accuracy of the timer.

When in Step S14 the differences in the transmission/reception switching timing between the selected service provider and the other service providers are determined to be the predetermined threshold time or more (Yes in Step S14), the transmission/reception switching timing of the selected service provider cannot be adopted in terms of reliability even if the base station is under a higher level of synchronization protection. Thus, the master station device 13 excludes the selected service provider from the subjects of the selection (Step S16), and returns to Step S13 again, and subjects the remaining service providers to the above processing.

When determining in Step S14 that the differences in the transmission/reception switching timing between the selected service provider and the other service providers are less than the predetermined threshold time (No in Step S14), the master station device 13 sets (while time synchronization is established), as reference transmission/reception switching timing, the transmission/reception switching timing of the selected service provider, that is, one of the normal transmission/reception switching timings between the master station device 13 and the RFUs 12-1 to 12-6, the one corresponding to one of the base station systems 11-1 to 11-7 having a higher level of synchronization protection, notifies the RFUs 12-1 to 12-6 of the reference transmission/reception switching timing, and ends the process (Step S15).

Thereby, the RFUs 12-1 to 12-6 correct the variations in the transmission/reception switching timing on the basis of the synchronized time, in accordance with the reference transmission/reception switching timing to switch transmission and reception at the reference transmission/reception switching timing.

As a result, transmission and reception can be switched in synchronization with the transmission/reception switching timing corresponding to one of the base station systems 11-1 to 11-7 having a higher level of synchronization protection among the transmission/reception switching timings between the master station device 13 and the RFUs 12-1 to 12-6, which enables reduction in the variations in the time-division timing among the different service providers and ensures an improvement in the service quality and the continuity of the service.

In the above, the GMC unit is connected to the master station device 13, however, the same process is feasible by the master station device 13 provided with (or connected to) one of the GPS receiver, the terrestrial digital tuner, and the atomic clock.

(2) Only the master station device 13 has absolute reference timing (timing signal).

In this case, only the master station device 13 is provided with (or connected to) one of the GPS receiver, the GMC unit, the terrestrial digital tuner, and the atomic clock, and all of the RFUs 12-1 to 12-6 are not compliant with the PTP specified in the IEEE 1588, for example.

Figure 5:
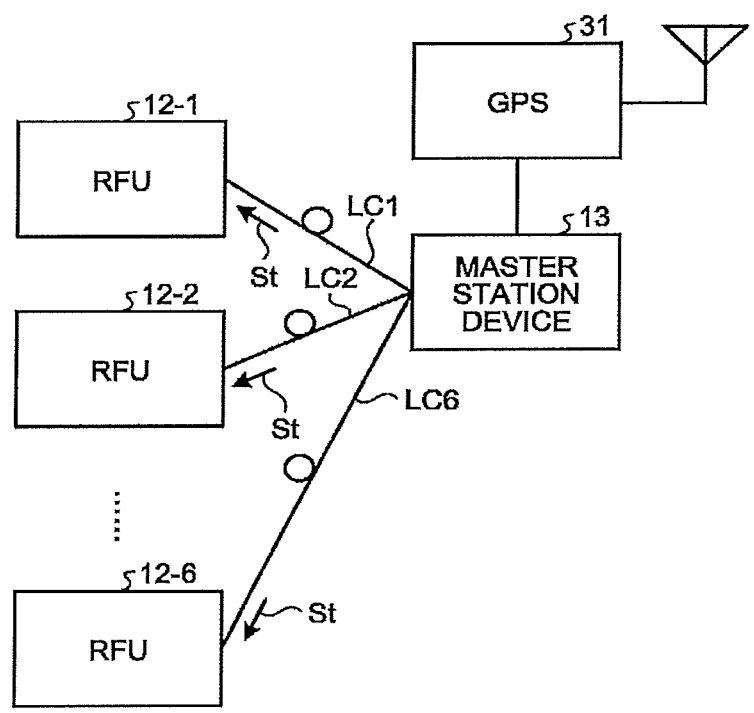
FIG. 5 is an explanatory diagram of a connection between a master station device and RFUs in a second mode.

FIG. 5 is an explanatory diagram of a connection between the master station device and the RFUs in the second mode.

In this case, the master station device 13 acquires the absolute reference timing from a GPS unit 31, and concurrently transmits reference timing signals St to the RFUs 12-1 to 12-6 in association with the acquired absolute reference timing.

As a result, each of the RFUs 12-1 to 12-6 can correct the transmission/reception switching timing according to a transmission line length of the corresponding one of the optical cables LC1 to LC6 and attain no effective differences in delay (or differences within a predetermined allowable range) there among.

Similarly to the item (1), the RFUs 12-1 to 12-6 set, as the reference transmission/reception switching timing, under established time synchronization, one of the transmission/reception switching timings between the master station device 13 and the RFUs 12-1 to 12-6, that is, the one corresponding to one of the base station systems 11-1 to 11-7 having a higher level of synchronization protection, and correct the variations in the transmission/reception switching timing in accordance with the reference transmission/reception switching timing. This makes it possible to reduce the variations in the time-division timing among the different service providers and ensure an improvement in the service quality and the continuity of the service.

(3) One of the RFUs (for example, RFU 12-1) alone has absolute reference timing (timing signal).

Figure 6:
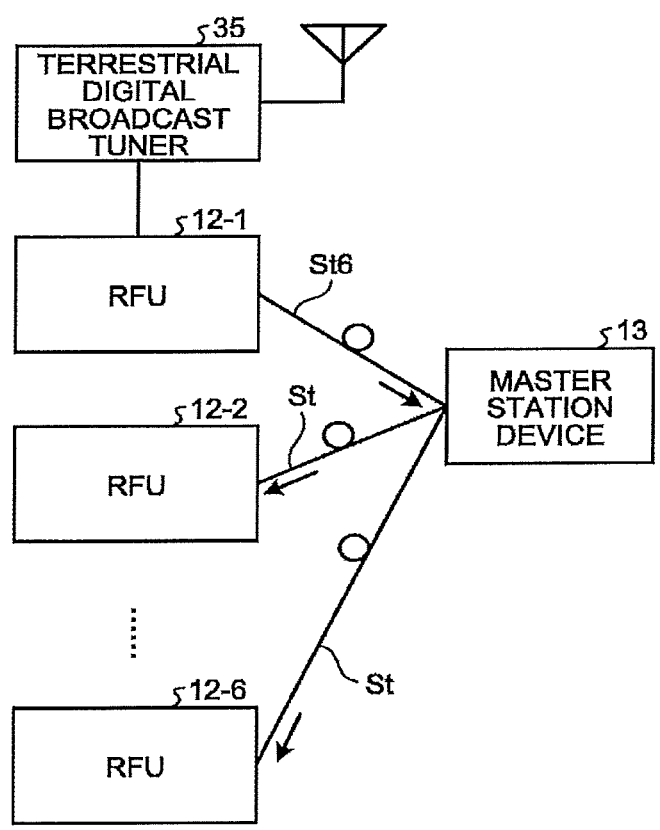
FIG. 6 is an explanatory diagram of a connection between a master station device and RFUs in a third mode.

FIG. 6 is an explanatory diagram of a connection between the master station device and the RFUs in the third mode.

In FIG. 6, the RFU 12-1 acquires, as the absolute reference timing, time information called a time offset table (TOT) with accuracy equivalent to that of an atomic clock from a terrestrial digital broadcast tuner 35, and transmits a reference timing signal St0 to the master station device 13 in association with the absolute reference timing. The master station device 13 concurrently transmits timing signals St to the RFUs 12-2 to 12-6 on the basis of the reference timing signal St0.

As a result, the master station device 13 can correct the transmission delay according to the transmission line length of the corresponding optical cable LC1. Each of the RFUs 12-2 to 12-6 can correct the transmission delay according to the transmission line length of the optical cable LC1 and the transmission line length of the corresponding one of the optical cables LC2 to LC6. Thereby, the RFUs 12-1 to 12-6 have no effective differences in delay thereamong (or differences within a predetermined allowable range).

Similarly to the item (1), the RFUs 12-1 to 12-6 correct set, as the reference transmission/reception switching timing, under established time synchronization, one of the transmission/reception switching timings between the master station device 13 and the RFUs 12-1 to 12-6, that is, the one corresponding to one of the base station systems 11-1 to 11-7 having a higher level of synchronization protection, and correct the variations in the transmission/reception switching timing in accordance with the reference transmission/reception switching timing. This makes it possible to reduce the variations in the time-division timing among the different service providers and ensure an improvement in the service quality and the continuity of the service.

(4) Only one slave station device 14-X (X: 1 to 8) has absolute reference timing (timing signal).

Figure 7:
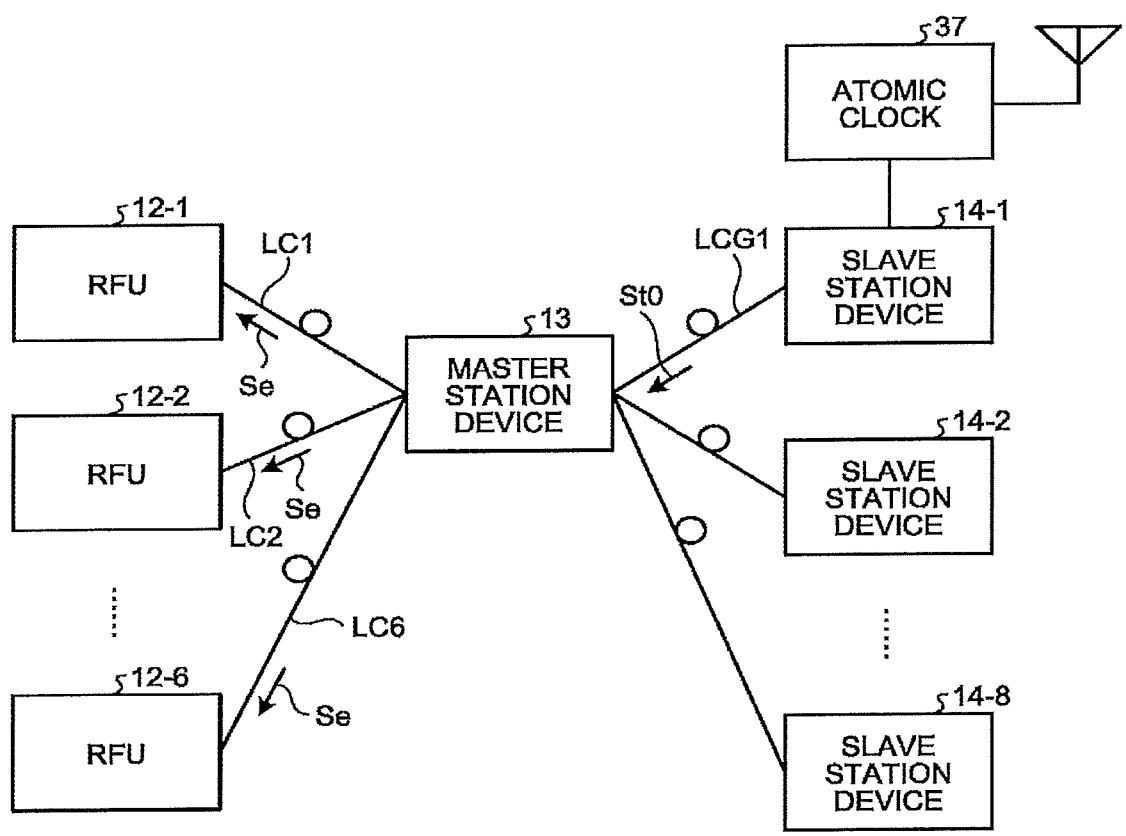
FIG. 7 is an explanatory diagram of a connection between a master station device, and RFUs and slave station devices in a fourth mode.

FIG. 7 is an explanatory diagram of a connection between the master station device, and the RFUs and the slave station devices in the fourth mode.

In FIG. 7, only the slave station device 14-1 has absolute reference timing (timing signal).

In FIG. 7, the slave station device 14-1 acquires time information as the absolute reference timing from an atomic clock 37, and transmits a reference timing signal St0 to the master station device 13 in association with the absolute reference timing. The master station device 13 concurrently transmits reference timing signals St to the RFUs 12-1 to 12-6 on the basis of the reference timing signal St0 corrected in accordance with the transmission line length of the corresponding optical cable LCG1.

As a result, each of the RFUs 12-1 to 12-6 corrects the transmission/reception switching according to the transmission line length of the optical cable LCG1 and the transmission line length of the corresponding one of the optical cables LC1 to LC6, and effectively eliminates differences in delay thereamong (or differences within a predetermined allowable range).

In this state, the master station device 13 sets, as the reference transmission/reception switching timing, one of the transmission/reception switching timings between the master station device 13 and the RFUs 12-1 to 12-6, that is, the one corresponding to one of the base station systems 11-1 to 11-7 having a higher level of synchronization protection, and notifies the RFUs 12-1 to 12-6 of the reference transmission/reception switching timing. Thus, the variations in the transmission/reception switching timing can be corrected in accordance with the reference transmission/reception switching timing being the one corresponding to one of the base station systems 11-1 to 11-7 having a higher level of synchronization protection, among the transmission/reception switching timings between the master station device 13 and the RFUs 12-1 to 12-6.

This can reduce the variations in the time-division timing among the different service providers, and ensure an improvement in the service quality and the continuity of the service.

The master station device 13 is connected to each of the slave station devices 14-1 to 14-8 via one or more optical cables. The transmission line lengths of the optical cables connected to the same slave station device can be regarded as the same.

(5) None of the master station device 13, the RFUs 12-1 to 12-6, and the slave station devices 14-1 to 14-8 has absolute reference timing (timing signal).

Figure 8:
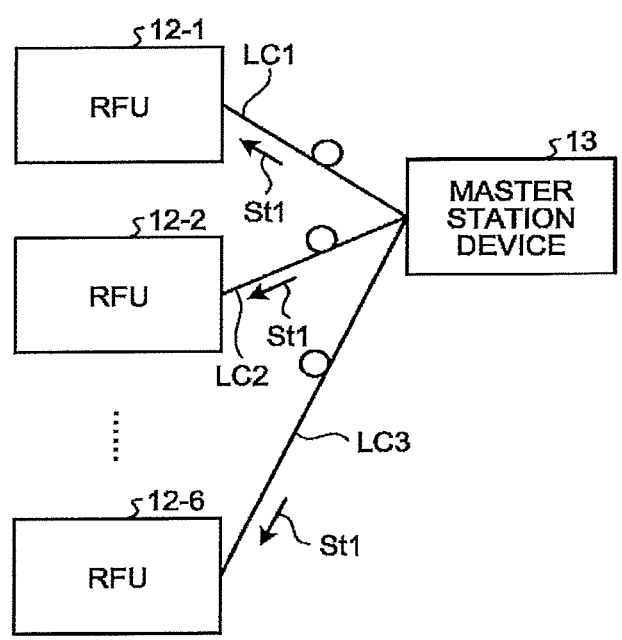
FIG. 8 is an explanatory diagram of a connection between a master station device and RFUs in a fifth mode.

FIG. 8 is an explanatory diagram of a connection between the master station device and the RFUs in the fifth mode.

In this state, the master station device 13 sets, as the reference transmission/reception switching timing, one of the transmission/reception switching timings between the master station device 13 and the RFUs 12-1 to 12-6, that is, the one corresponding to one of the base station systems 11-1 to 11-7 having a higher level of synchronization protection, and transmits to the RFUs 12-1 to 12-6 predetermined reference timing signals St1 associated with the reference transmission/reception switching timing.

Thereby, each of the RFUs 12-1 to 12-6 corrects the transmission/reception switching timing according to the transmission line length of the corresponding one of the optical cables LC1 to LC6 and effectively eliminates differences in delay thereamong (or differences within a predetermined allowable range).

This can correct the variations in the transmission/reception switching timing, reduce the variations in the time-division timing among the different service providers, and ensure an improvement in the service quality and the continuity of the service.

Further, the master station device may be connected to a timing generator. The master station device 13 may transmit a timing signal corresponding to the timing generator to the RFUs 12-1 to 12-6. Each of the RFUs 12-1 to 12-6 may correct the transmission/reception switching timing according to the transmission line length of the corresponding one of the optical cables LC1 to LC6 and attain no effective difference in delay relative to the master station device 13 (or differences within a predetermined allowable range).

Figure 9:
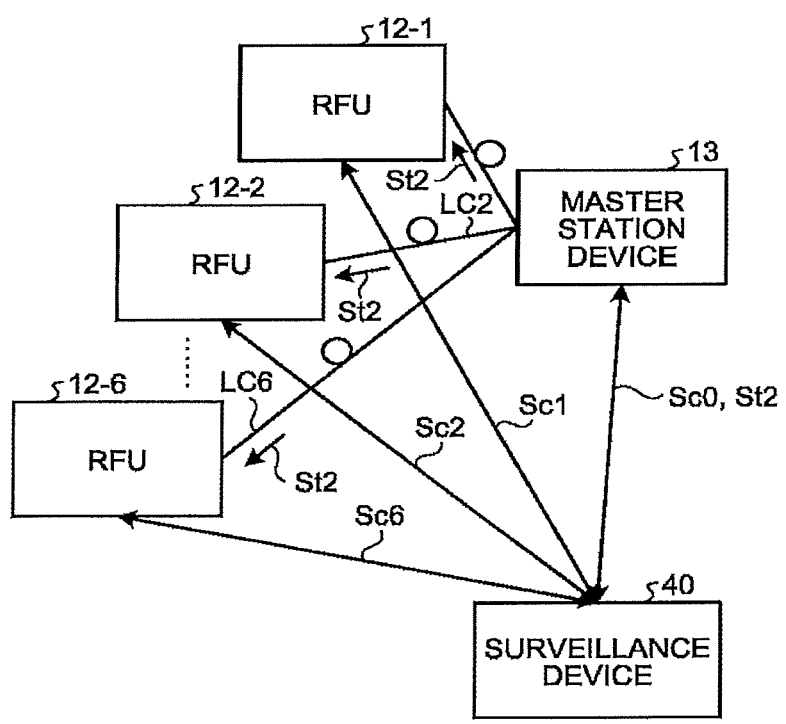
FIG. 9 is an explanatory diagram of a first modification in the fifth mode.

FIG. 9 is an explanatory diagram of a first modification in the fifth mode.

In the first modification, the master station device 13 is connected to a surveillance device 40. The surveillance device 40 receives signals Sc0 to Sc6 corresponding to the transmission/reception switching timings from the master station device 13 and the RFUs 12-1 to 12-6, and sets the reference transmission/reception switching timing (for example, the transmission/reception switching timing corresponding to one of the base station systems 11-1 to 11-7 having a higher level of synchronization protection within the predetermined threshold time) according to the received signals. The surveillance device 40 transmits a corresponding reference timing signal St2 to the master station device 13, and the master station device 13 transmits the reference timing signals St2 to the RFUs 12-1 to 12-6. Each of the RFUs 12-1 to 12-6 corrects the transmission/reception switching timing according to the transmission line length of the corresponding one of the optical cable LC1 to LC6 and attains no effective differences in delay relative to the master station device 13 (or differences within a predetermined allowable range).

In this case, the reference timing signal St2 output from the surveillance device 40 can be appropriately set in the surveillance device 40 as the transmission/reception switching timing corresponding to the base station system having a higher level of synchronization protection, by an operator (when the surveillance device 40 is installed remotely from the communication repeater system 20) or by a worker (when the surveillance device 40 is installed in the same location as the communication repeater system 20) regardless of the transmission/reception switching timings between the master station device 13 and the RFUs 12-1 to 12-6.

Figure 10:
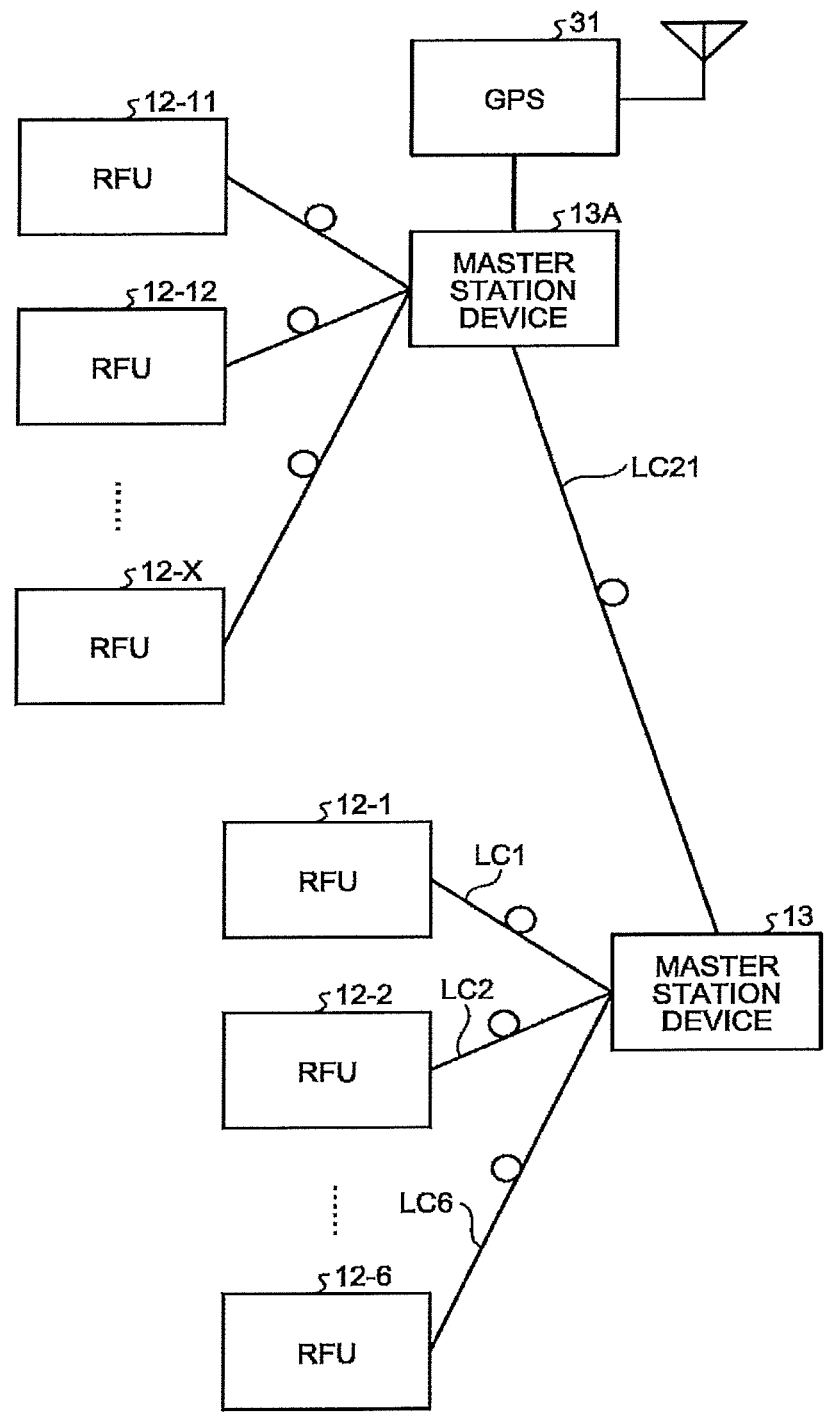
FIG. 10 is an explanatory diagram of a second modification in the fifth mode.

FIG. 10 is an explanatory diagram of a second modification in the fifth mode.

In the second modification, the master station device 13 is connected to another master station device 13A having absolute reference timing (timing signal) via an optical cable LC21.

For the master station device 13, another master station device 13A is equivalent to one of the GPS receiver, the GMC unit, the terrestrial digital tuner, and the atomic clock. Thus, the master station device 13 can attain no differences in delay (or differences within a predetermined allowable range) relative to the RFUs 12-1 to 12-6 in the same manner as in the second mode.

The master station device 13 of the present embodiment includes a control device such as a CPU, a storage such as a read only memory (ROM) or a RAM, and an external storage such as an HDD or a CD drive device, and has a hardware configuration of a general computer.

Programs executed by the master station device 13 or the RFUs 12-1 to 12-6 of the present embodiment are recorded and provided in installable or executable file format on a computer readable recording medium including a CD-ROM, a DVD, or a USB memory.

The programs executed by the master station device 13 or the RFUs 12-1 to 12-6 of the present embodiment may be stored on a computer connected to a network such as the Internet and downloaded via the network. Programs executed by the communication repeater system 20 of the present embodiment may be provided or distributed via a network such as the Internet.

The programs of the communication repeater system of the present embodiment may be incorporated into a ROM in advance, for example.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication repeater system comprising:
a plurality of radio frequency units that corresponds to a plurality of base station systems, and converts a radio signal from the corresponding base station systems into a digital signal and transmits the digital signal, the base station systems have mutually independent transmission and reception switching timings at which transmission and reception of an uplink signal and a downlink signal are switched by time division;
a plurality of slave station devices; and
a master station device that receives the digital signal from the radio frequency units, and establishes communication with a mobile communication terminal device via a corresponding one of the slave station devices, the communication repeater system repeats communication between the mobile communication terminal device and the base station systems, wherein
the master station device comprises:
a timing detector that detects a transmission and reception switching timing between the master station device and each of the radio frequency units from the digital signal;
a protection level detector that detects a level of synchronization protection of each of the base station systems, and
a setter that determines, on the basis of a result of the detection by the protection level detector, the base station system being in continuous synchronization for a longer period among the base station systems, sets the transmission and reception switching timing of the determined base station system as a reference transmission and reception switching timing, and notifies the radio frequency units of the reference transmission and reception switching timing, and
the radio frequency units each comprise a corrector that corrects a variation in the transmission and reception switching timings in accordance with the notified reference transmission and reception switching timing.

2. The communication repeater system according to claim 1, wherein
the setter transmits a timing signal corresponding to the reference transmission and reception switching timing to the corrector.

3. A communication repeater system that repeats communication between a mobile communication terminal device and a plurality of base station systems that has mutually independent transmission and reception switching timings at which transmission and reception of an uplink signal and a downlink signal are switched by time division, the system comprising:
a protection level detector that detects a level of synchronization protection of each of the base station systems; and
a setter that determines, on the basis of a result of the detection by the protection level detector, the base station system being in continuous synchronization for a longer period among the base station systems, sets the transmission and reception switching timing of the determined base station system as a reference transmission and reception switching timing, and notifies the radio frequency units of the reference transmission and reception switching timing; and
a corrector that corrects a variation in the transmission and reception switching timings between the mobile communication terminal device and the base station systems in accordance with the reference transmission and reception switching timing.

4. The communication repeater system according to claim 3, further comprising:
a timing detector that detects each of the transmission and reception switching timings.

5. The communication repeater system according to claim 4, further comprising:
a master station device; and
a plurality of radio frequency units that converts a radio signal from each of the base station systems into a digital signal and transmits the digital signal, wherein
the master station device comprises the timing detector, the protection level detector, and the setter, and
the radio frequency units each comprises the corrector.

6. The communication repeater system according to claim 5, wherein
the timing detector detects the transmission and reception switching timing between the master station device and the radio frequency units.

7. The communication repeater system according to claim 6, wherein
the corrector corrects the variation in the transmission and reception switching timings in consideration of a transmission delay amount between the master station device and each of the radio frequency units.

8. The communication repeater system according to claim 5, wherein
the setter transmits a timing signal corresponding to the reference transmission and reception switching timing to the corrector.

9. A method to be executed by a communication repeater system, the system comprising a plurality of radio frequency units that corresponds to a plurality of base station systems, and converts a radio signal from the corresponding base station systems into a digital signal and transmits the digital signal, the base station systems have mutually independent transmission and reception switching timings at which transmission and reception of an uplink signal and a downlink signal are switched by time division; a plurality of slave station devices; and a master station device that receives the digital signal from the radio frequency units via a corresponding one of the slave station devices, and establishes communication with a mobile communication terminal device, the communication repeater system repeats communication between the mobile communication terminal device and the base station systems, the method comprising:
detecting a transmission and reception switching timing between the master station device and each of the radio frequency units from the digital signal;
detecting a level of synchronization protection of each of the base station systems;
determining, on the basis of a result of the detection of synchronization protection level, the base station system being in continuous synchronization for a longer period among the base station systems, and setting the transmission and reception switching timing of the determined base station system as a reference transmission and reception switching timing; and
correcting a variation in the transmission and reception switching timings in accordance with the reference transmission and reception switching timing.

10. A method to be executed by a communication repeater system, the system that repeats communication between a mobile communication terminal device and a plurality of base station systems that has mutually independent transmission and reception switching timings at which transmission and reception of an uplink signal and a downlink signal are switched by time division, the method comprising:

determining, among the base station systems, the base station system being in continuous synchronization for a longer period, and setting the transmission and reception switching timing of the determined base station system as reference transmission and reception switching timing; and correcting a variation in the transmission and reception switching timings between the mobile communication terminal device and the base station systems in accordance with the reference transmission and reception switching timing.

* * * * *